(12) United States Patent
Liu et al.

(10) Patent No.: US 12,104,993 B2
(45) Date of Patent: Oct. 1, 2024

(54) WHOLE-PROCESS AUTOMATIC SOIL TABLETTING MACHINE

(71) Applicant: ZHEJIANG UNIVERSITY, Zhejiang (CN)

(72) Inventors: Fei Liu, Zhejiang (CN); Xiangyu Lu, Zhejiang (CN); Tiantian Pan, Zhejiang (CN); Jun Zhou, Zhejiang (CN); Jiangang Shen, Zhejiang (CN); Wenwen Kong, Zhejiang (CN); Xiaolong Li, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 294 days.

(21) Appl. No.: 17/629,455

(22) PCT Filed: Feb. 1, 2021

(86) PCT No.: PCT/CN2021/074639
§ 371 (c)(1),
(2) Date: Jan. 24, 2022

(87) PCT Pub. No.: WO2022/041655
PCT Pub. Date: Mar. 3, 2022

(65) Prior Publication Data
US 2022/0349785 A1    Nov. 3, 2022

(30) Foreign Application Priority Data
Aug. 25, 2020   (CN) .......................... 202010862936.0

(51) Int. Cl.
*G01N 1/28* (2006.01)
*B08B 1/12* (2024.01)
(Continued)

(52) U.S. Cl.
CPC ............... *G01N 1/286* (2013.01); *B08B 1/12* (2024.01); *B08B 1/30* (2024.01); *B08B 3/04* (2013.01);
(Continued)

(58) Field of Classification Search
CPC .................... G01N 1/286; G01N 1/44; G01N 2001/2866; G01N 1/28; G01N 1/36;
(Continued)

(56) References Cited

FOREIGN PATENT DOCUMENTS

| CN | 105690836 A | * | 6/2016 | ............... B30B 1/20 |
| CN | 106770409 A | * | 5/2017 | |

* cited by examiner

*Primary Examiner* — Robert R Raevis
(74) *Attorney, Agent, or Firm* — Onello & Mello, LLP

(57) ABSTRACT

A whole-process automatic soil tabletting machine is provided. The machine includes a device body. A tabletting platform is arranged at a bottom of the device body, a first station on which a heating device is arranged, second and third stations are arranged on the tabletting platform. A top plate is arranged at a top of the device body. A soil crushing cutter and a punch head are installed on the top plate. The soil crushing cutter and the punch head are arranged above the first and second stations respectively. The tabletting platform is installed with a groove disc where sample preparation grooves and a cleaning groove are formed. The sample preparation grooves and the cleaning groove correspond to the first station, the second station or the third station. The cleaning groove and each sample preparation groove are for placing a cleaning container and a soil sample container, respectively.

11 Claims, 2 Drawing Sheets

(51) Int. Cl.
*B08B 1/30* (2024.01)
*B08B 3/04* (2006.01)
*B30B 11/04* (2006.01)
*G01N 1/44* (2006.01)

(52) U.S. Cl.
CPC ............... *B30B 11/04* (2013.01); *G01N 1/44* (2013.01); *G01N 2001/2866* (2013.01)

(58) Field of Classification Search
CPC ............ G01N 2001/2873; B08B 1/002; B08B 1/008; B08B 3/04; B08B 1/04; B08B 3/102; B30B 11/04; B30B 11/10; B30B 15/0082; B02C 18/08; B02C 23/08
USPC .................... 73/863, 863.11, 863.12, 863.23; 134/22.1, 61, 82, 104.1, 105, 113, 115 R; 100/70 R, 92, 305, 315, 320, 94
See application file for complete search history.

WHOLE-PROCESS AUTOMATIC SOIL TABLETTING MACHINE

CROSS REFERENCE TO RELATED APPLICATIONS

This patent application is a national stage application of International Patent Application No. PCT/CN2021/074639, filed on Feb. 1, 2021, which claims priority of Chinese Patent Application No. 202010862936.0 filed on Aug. 25, 2020, both of which are incorporated by reference herein in their entirety as part of the present application.

TECHNICAL FIELD

The present disclosure relates to the field of soil tabletting technologies, in particular to a whole-process automatic soil tabletting machine.

BACKGROUND ART

Tabletting of soil is a sample form and a sample preparation method which are usually needed in experiments for evaluating soil fertility and detecting soil heavy metal pollution. In order to obtain good experimental results, a plurality of groups of tabletting samples need to be prepared, and a plurality of tabletting samples need to be prepared in each group repeatedly. The total number of samples to be prepared is therefore very large. However, steps of screening, grinding, drying, and tabletting, which are conducted manually step by step, are most common in the soil tabletting preparation mode at present, and thus a large amount of manpower is spent under the condition that the number of samples to be prepared is large.

Therefore, there is an urgent need for a whole-process automatic soil tabletting machine to solve the problem existing in the prior art.

SUMMARY

The present disclosure aims to provide a whole-process automatic soil tabletting machine to solve a problem that the preparation process of the soil sample is complex and tedious, and to integrate structures required by all processes together to realize the automatic completion of thermal drying, powdering and compacting.

In order to achieve the purpose, the present disclosure provides the following scheme: a whole-process automatic soil tabletting machine provided by the present disclosure includes a device body. A tabletting platform is arranged at a bottom of the device body. A first station, a second station and a third station are arranged on the tabletting platform, and a heating device is arranged on the first station. A top plate is arranged at a top of the device body, a soil crushing cutter and a punch head are installed on the top plate, and the soil crushing cutter and the punch head are arranged above the first station and the second station respectively. The tabletting platform is further installed with a groove disc, sample preparation grooves and a cleaning groove are formed in the groove disc. The sample preparation grooves and the cleaning groove correspond to the first station, the second station or the third station, and the cleaning groove and each of the sample preparation grooves are configured for placing a cleaning container and a soil sample container, respectively.

In some embodiments, an inner part of the soil sample container is bowl-shaped, and the soil sample container is made of an iron material. First outer supporting plates are arranged at respective bottoms of outer walls of the soil sample container and configured for enabling the soil sample container to be stably fixed in a corresponding one of the sample preparation grooves.

In some embodiments, the cleaning groove may be arranged on the groove disc, an inner part of the cleaning container may be bowl-shaped. Second outer supporting plates may be arranged at respective bottoms of outer walls of the cleaning container, and the cleaning container may be fixed in the cleaning groove and may rotate along with the cleaning groove. And an inner bottom of the cleaning container may be further distributed with a brush.

In some embodiments, the heating device may be an electromagnetic heater.

In some embodiments, the top plate may be provided with a soil crushing cutter rest, the soil crushing cutter rest may be located above the first station. The top plate may be provided with a slide track, a top of the soil crushing cutter rest may be connected with a first lifting device, which may drive the soil crushing cutter rest to move up and down along the slide track. A sealing groove may be formed in a periphery of a bottom of the soil crushing cutter rest and configured for being tightly attached to an edge of the soil sample container to form closed space. And the soil crushing cutter may be installed on the soil crushing cutter rest.

In some embodiments, a top of the punch head may be connected with a second lifting device, which may drive the punch head to move up and down along the slide track on the top plate, a size of a lower portion of the punch head may be smaller than an inner diameter of the soil sample container, and the punch head may be configured for extending into the soil sample container to compact soil.

In some embodiments, the first lifting device and the second lifting device may be telescopic rods or rotary screw rods.

In some embodiments, the whole-process automatic soil tabletting machine further may includes a screen, where the screen may be configured for covering the soil sample container to screen sundries in a soil sample.

In some embodiments, the first station, the second station and the third station may be uniformly distributed in a triangle at an interval of 120 degrees. The sample preparation grooves may include two sample preparation grooves, and the cleaning groove and the two sample preparation grooves may be uniformly distributed in the triangle at the interval of 120 degrees. And an arc-shaped notch may be formed in the top plate of the device body and located above the third station.

In some embodiments, the whole-process automatic soil tabletting machine may be configured for tabletting easily-pulverized samples.

Compared with the prior art, the present disclosure has the following beneficial technical effects.

The problem that the preparation process of the soil sample is complex and tedious can be solved. Compared with a traditional mode that tabletting of soil is performed manufacturing, manual grinding and tabletting step by step, the device integrates structures required by all processes together, and the automatic completion of thermal drying, powdering and compacting is realized. The device is provided with the soil sample containers each of which is arranged with one soil sample, and the device can be self-cleaned, so that cross contamination among different batches of the soil samples can be avoided. The device is compact in overall design structure, relatively small in size and convenient to move and carry. In addition, the use scenes are diversified. Besides tabletting of the soil sample, the preparation of tabletting of the easily-pulverized sample, such as flour and dry organic fertilizer, can be achieved.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Figure 1:
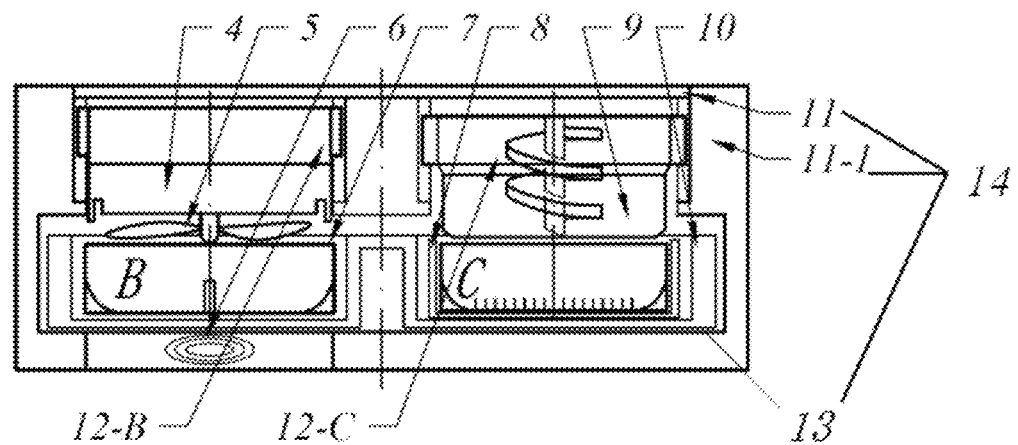
FIG. 1 is a structural schematic diagram of a whole-process automatic soil tabletting machine according to the present disclosure.

List of reference characters: 1 screen; 2 soil sample container; 2-1 first outer supporting plate; 3 cleaning container; 3-1 brush, 3-2 second outer supporting plate; 4 soil crushing cutter rest; 5 soil crushing cutter; 6 heating device; 7 sample preparation groove; 8 cleaning groove; 9 punch head; 10 groove disc; 11 top plate; 12-B first lifting device, 12-C second lifting device; 11-1 side portion; 13 tabletting platform; 14 device body; A third station; B first station; and C second station.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

To make the foregoing objective, features and advantages of the present disclosure clearer and more comprehensible, the present disclosure is further described in detail below with reference to the attached figures and specific embodiments.

Figure 2:
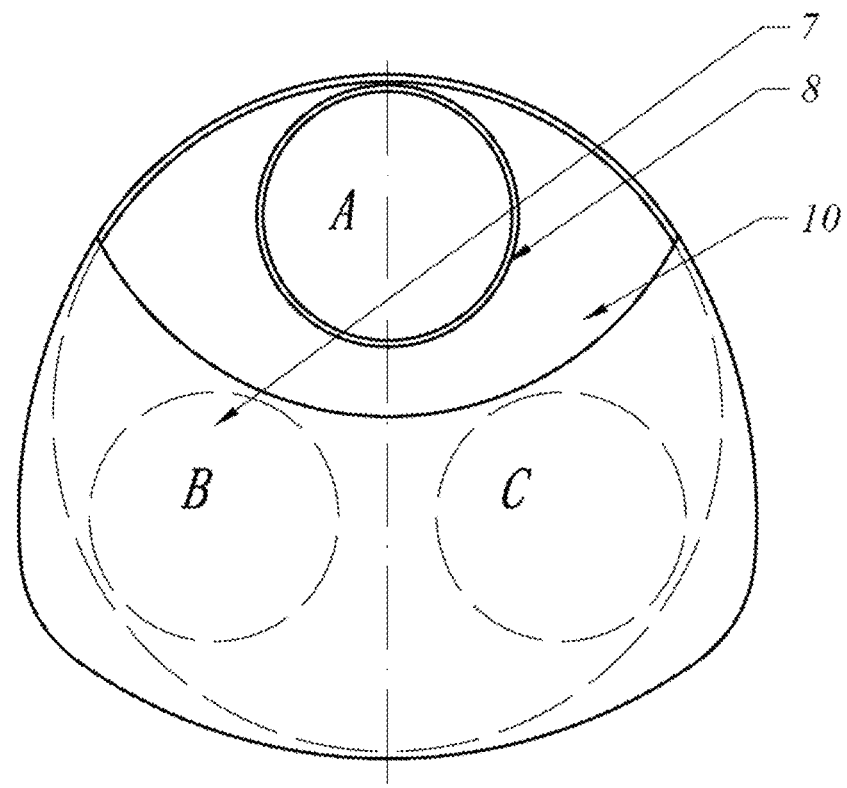
FIG. 2 is a top view of the whole-process automatic soil tabletting machine according to the present disclosure.
Figure 3:
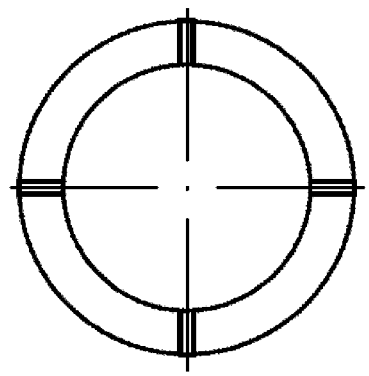
FIG. 3 is a top view of a soil sample container according to the present disclosure.
Figure 4:
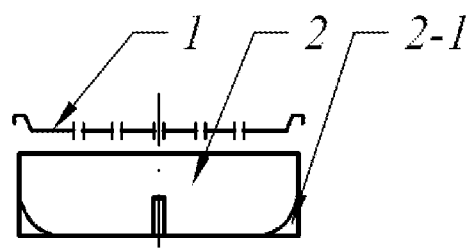
FIG. 4 is a schematic diagram of the soil sample container and a screen according to the present disclosure.
Figure 5:
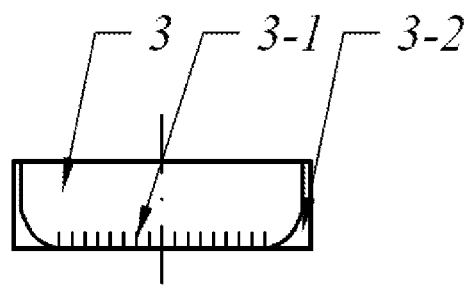
FIG. 5 is a structural schematic diagram of a cleaning container according to the present disclosure.

As shown in FIG. 1 to FIG. 5, the embodiment provides a whole-process automatic soil tabletting machine. The whole-process automatic soil tabletting machine includes a device body 14. A tabletting platform 13 is arranged at a bottom of the device body, a first station B, a second station C and a third station A are arranged on the tabletting platform, and a heating device 6 is arranged on the first station B. A top plate 11 is arranged at a top of the device body. A side portion 11-1 extends between the tabletting platform and the top plate. A soil crushing cutter 5 and a punch head 9 are installed on the top plate, and the soil crushing cutter 5 and the punch head 9 are arranged above the first station B and the second station C respectively. A groove disc 10 is further installed on the tabletting platform. Specifically, a middle part of the tabletting platform is provided with a center shaft, and a bottom of the groove disc 10 is installed on the center shaft. Sample preparation grooves 7 and a cleaning groove 8 are formed in the groove disc 10. The sample preparation grooves 7 and the cleaning groove 8 correspond to positions of the first station B, the second station C or the third station A, and the cleaning groove 8 and each of the sample preparation grooves 7 are configured for placing a cleaning container 3 and a soil sample container 2, respectively.

In the embodiments, an inner part of the soil sample container 2 is bowl-shaped, and the soil sample container is made of an iron material. First outer supporting plates 2-1 are arranged at respective bottoms of outer walls of the soil sample container, so that the soil sample container can be stably fixed in the sample preparation grooves 7. The screen 1 is of an independent structure matched with the soil sample container 2 and can tightly cover the soil sample container 2 to be used for screening sundries in a soil sample.

In the embodiments, the cleaning container 3 and the soil sample container 2 are the same in size and similar in appearance. The cleaning container 3 can be fixed in the cleaning groove 8 and rotate along with the cleaning groove 8. A brush 3-1 is further distributed at a bottom in the cleaning container. The cleaning groove 8 can rotate itself, so as to drive the cleaning container 3 and the brush to clean the soil crushing cutter 5 and the punch head 9. Specifically, a bottom of the cleaning groove 8 is installed on the groove disc through a rotating shaft, and the cleaning groove 8 can be driven to rotate through a driving device such as a motor.

In the embodiments, the soil crushing cutter rest 4 is located at the first station B at an upper portion of the tabletting platform and can move up and down along a slide track on the top plate. A sealing groove is formed in a periphery of a bottom of the soil crushing cutter rest 4 and can be tightly attached to an edge of the soil sample container 2 to form a closed space when the soil crushing cutter rest 4 falls down. The soil crushing cutter 5 is installed on a bottom portion of the soil crushing cutter rest 4 and can rotate at a high speed when the soil sample container is closed. A motor can be arranged on the soil crushing cutter rest and configured for driving the soil crushing cutter 5 to rotate.

In the embodiments, the heating device 6 is located in the first station B at a bottom of the tabletting platform. The heating mode of the heating device 6 is electromagnetic heating, and the soil sample can be indirectly heated and dried by heating the iron soil sample container 4.

In the embodiments, the punch head 9 is located above the second station C of the tabletting platform and can move up and down along the slide track. Pressing power of the punch head comes from a rotary screw rod arranged in the punch head. A size of a lower portion of the punch head is smaller than an inner diameter of the soil sample container, and the punch head can extend into the soil sample container to compact the soil.

In the embodiments, the two sample preparation grooves 7 are formed. The two sample preparation grooves 7 and the cleaning groove 8 are all located in the groove disc 10 and evenly distributed at an interval of 120 degrees. A distribution mode of the two sample preparation grooves 7 and the cleaning groove 8 is the same as the distribution mode of the stations. The groove disc 10 can horizontally rotate around the center shaft of the tabletting platform, and the alternation of all procedures is achieved.

Further, the soil sample is only one use scene of the embodiment, and the embodiment can also be used for tabletting preparation of easily-pulverized samples such as flour and dry organic fertilizer.

The automatic tabletting preparation process in the embodiment includes the following steps.

Firstly, each soil sample container 2 is filled with the soil sample through the screen 1, and the soil sample containers 2 are placed in the respective sample preparation grooves 7 at the third station A of the groove disc 10.

Secondly, the groove disc 10 rotates to the first station B, and the soil crushing cutter rest 4 descends to seal the soil sample containers 2.

Thirdly, the soil sample containers 2 are electromagnetically heated by the heating device 6 below the sample preparation grooves 7, and the soil crushing cutter 5 rotates at a high speed to blow and stir the soil sample.

Fourthly, the soil crushing cutter rest 4 is raised, the groove disc 10 rotates to the second station C, and the soil sample in the soil sample container 2 is compacted by the punch head 9.

Fifthly, the punch head 9 is raised, the groove disc 10 is reset to the third station A, and a soil tabletting process is completed.

The self-cleaning process in the embodiment includes the following steps.

Firstly, cleaning solution is placed in the cleaning container 3, and the cleaning container 3 is putted in the cleaning groove 8 at the third station A.

Secondly, the groove disc 10 rotates to the first station B, and the soil crushing cutter rest 4 descends to seal the cleaning container 3.

Thirdly, the soil crushing cutter 5 rotates clockwise and anticlockwise at a low speed, and the residual soil powder on parts of the crushing cutter rest 4 is taken away by the cleaning solution.

Fourthly, the groove disc 10 rotates to the second station C, the pressing head 9 descends, the cleaning container 3 is driven to rotate by the cleaning groove 8, and residues at a bottom of the punch head 9 are wiped away by short bristles of the brush at the bottom of the cleaning container 3.

Fifthly, the punch head 9 is raised, the groove disc 10 is reset to the third station A, and the self-cleaning process of the device is completed.

It needs to be noted that for those skilled in the art, apparently the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, therefore, all changes, including the meanings and scopes of equivalent elements, of the claims are aimed to be included in the present disclosure, and any mark of attached figures in the claims should not be regarded as limitation to the involved claims.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A whole-process automatic soil tabletting machine, the tabletting machine comprising:
    a device body, wherein the device body comprises a tabletting platform, a top plate and a side portion extending between the tabletting platform and the top plate;
    wherein the tabletting platform is located at a bottom of the device body, the tabletting platform is provided with a first station, a second station and a third station, and a heating device is arranged on the first station;
    the top plate is located at a top of the device body, a soil crushing cutter and a punch head are installed on the top plate, and the soil crushing cutter and the punch head are arranged above the first station and the second station respectively;
    the tabletting platform is further installed with a groove disc, sample preparation grooves and a cleaning groove are formed in the groove disc, each of the sample preparation grooves and the cleaning groove is located at a corresponding one of the first station, the second station or the third station; and
    the cleaning groove and each of the sample preparation grooves are configured for placing a cleaning container and a soil sample container, respectively.

2. The whole-process automatic soil tabletting machine according to claim 1, wherein an inner part of the soil sample container is bowl-shaped, and the soil sample container is made of an iron material, wherein:
    first outer supporting plates are arranged at respective bottoms of outer walls of the soil sample container and configured to enable the soil sample container to be stably fixed in a corresponding one of the sample preparation grooves.

3. The whole-process automatic soil tabletting machine according to claim 1, wherein the cleaning groove is arranged on the groove disc, an inner part of the cleaning container is bowl-shaped, wherein:
    second outer supporting plates are arranged at respective bottoms of outer walls of the cleaning container, and the cleaning container is fixed in the cleaning groove and rotates along with the cleaning groove; and
    an inner bottom of the cleaning container is further distributed with a brush.

4. The whole-process automatic soil tabletting machine according to claim 1, wherein the heating device is an electromagnetic heater.

5. The whole-process automatic soil tabletting machine according to claim 1, wherein
    a soil crushing cutter rest is provided at a bottom of the top plate and is located inside the device body, the soil crushing cutter rest is located above the first station, the top plate is provided with a slide track, a top of the soil crushing cutter rest is connected with a first lifting device configured to drive the soil crushing cutter rest to move up and down along the slide track;
    a sealing groove is formed in a periphery of a bottom of the soil crushing cutter rest and configured to be tightly attached to an edge of the soil sample container to form closed space; and
    the soil crushing cutter is installed on the soil crushing cutter rest.

6. The whole-process automatic soil tabletting machine according to claim 5, wherein a top of the punch head is connected with a second lifting device, configured to drive the punch head to move up and down along the slide track on the top plate, a size of a lower portion of the punch head is smaller than an inner diameter of the soil sample container, and the punch head is configured to extend into the soil sample container to compact soil.

7. The whole-process automatic soil tabletting machine according to claim 6, wherein the first lifting device and the second lifting device are telescopic rods or rotary screw rods.

8. The whole-process automatic soil tabletting machine according to claim 6, wherein the first lifting device and the second lifting device are telescopic rods or rotary screw rods.

9. The whole-process automatic soil tabletting machine according to claim 1, the tabletting machine further comprising a screen, wherein the screen is configured for covering the soil sample container to screen sundries in a soil sample.

10. The whole-process automatic soil tabletting machine according to claim 1, wherein the first station, the second station and the third station are uniformly distributed in a triangle at an interval of 120 degrees, the sample preparation grooves comprise two sample preparation grooves, and the cleaning groove and the two sample preparation grooves are uniformly distributed in the triangle at the interval of 120 degrees; and an arc-shaped notch is formed in the top plate of the device body and located above the third station.

11. The whole-process automatic soil tabletting machine according to claim 1, wherein the whole-process automatic soil tabletting machine is configured for tabletting easily-pulverized samples.

\* \* \* \* \*